(12) United States Patent
Ohno et al.

(10) Patent No.: US 7,331,000 B2
(45) Date of Patent: Feb. 12, 2008

(54) APPARATUS AND STORAGE SYSTEM FOR CONTROLLING ACQUISITION OF SNAPSHOT

(75) Inventors: Hiroshi Ohno, Odawara (JP); Hideo Tabuchi, Odawara (JP); Akinobu Shimada, Chigasaki (JP); Masataka Innan, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/329,076

(22) Filed: Jan. 11, 2006

(65) Prior Publication Data

US 2006/0129886 A1 Jun. 15, 2006

Related U.S. Application Data

(63) Continuation of application No. 10/768,173, filed on Feb. 2, 2004, now Pat. No. 7,017,076.

(30) Foreign Application Priority Data

Jul. 29, 2003 (JP) ............................. 2003-281759

(51) Int. Cl.
*G06F 11/00* (2006.01)
(52) U.S. Cl. .................... 714/20; 714/16; 714/15; 707/202; 707/204
(58) Field of Classification Search .................... None
See application file for complete search history.

(56) References Cited

U.S. PATENT DOCUMENTS

| 5,369,757 A | 11/1994 | Spiro et al. |
| 5,379,412 A | 1/1995 | Eastridge et al. |
| 5,778,388 A | 7/1998 | Kawamura et al. |
| 5,835,953 A | 11/1998 | Ohran |
| 6,182,198 B1 | 1/2001 | Hubis et al. |
| 6,266,781 B1 | 7/2001 | Chung et al. |
| 6,360,331 B2 | 3/2002 | Vert et al. |
| 6,594,744 B1 | 7/2003 | Humlicek et al. |
| 6,691,245 B1 | 2/2004 | DeKoning |
| 2002/0078398 A1 | 6/2002 | Kohno et al. |
| 2002/0099916 A1 | 7/2002 | Ohran et al. |
| 2004/0193945 A1 | 9/2004 | Eguchi et al. |
| 2005/0005070 A1 | 1/2005 | Lam |
| 2005/0081099 A1 | 4/2005 | Chang et al. |

FOREIGN PATENT DOCUMENTS

| JP | 6-83687 | 2/1993 |
| JP | 8-87510 | 9/1994 |
| JP | 2000-105754 | 7/1999 |
| JP | 2002-163046 | 11/2000 |

*Primary Examiner*—Marc Duncan
(74) *Attorney, Agent, or Firm*—Reed Smith LLP; Stanley P. Fisher, Esq.; Juan Carlos A. Marquez, Esq.

(57) ABSTRACT

A DBMS performs a checkpoint process for maintaining consistency of data. A snapshot acquisition control program detects the checkpoint process externally to the DBMS and creates a snapshot in an external storage according to the timing of the checkpoint. Correspondence between checkpoints and snapshots is maintained in a CP-SH correspondence management table to make it possible to restore in a short time data at the time of an arbitrary checkpoint.

19 Claims, 9 Drawing Sheets

FIG.3

| CHECKPOINT ID | SNAPSHOT ID |
|---|---|
| 62119 | GEN034 |
| 62220 | GEN035 |
| ⋮ | ⋮ |

FIG.4

| SNAPSHOT ID | SNAPSHOT MANAGEMENT ADDRESS IN DATA TABLE 31 | SNAPSHOT MANAGEMENT ADDRESS IN Redo LOG 32 | SNAPSHOT MANAGEMENT ADDRESS IN OPERATION LOG 33 |
|---|---|---|---|
| GEN034 | LU2F3A-GEN034 | LU2FB-GEN034 | LU2FC-GEN034 |
| GEN035 | LU2F3A-GEN035 | LU2FB-GEN035 | LU2FC-GEN035 |
| GEN036 | LU2F3A-GEN036 | LU2FB-GEN036 | LU2FC-GEN036 |
| ⋮ | ⋮ | ⋮ | ⋮ |

APPARATUS AND STORAGE SYSTEM FOR CONTROLLING ACQUISITION OF SNAPSHOT

CROSS-REFERENCES TO RELATED APPLICATIONS

This application is a Continuation of U.S. application Ser. No. 10/768,173 filed on Feb. 2, 2004, now U.S. Pat. No. 7,017,076 and claims priority from U.S. application Ser. No. 10/768,173 filed on Feb. 2, 2004, which claims priority from Japanese Patent Application No. 2003-281759 filed on Jul. 29, 2003, the entire disclosure of which is incorporated herein by reference.

BACKGROUND OF THE INVENTION

1. Field of the Invention

The present invention relates to an apparatus and a method for controlling an operation of acquiring a snapshot of a database built on an external storage of a computer system.

2. Background Art

In operating a database, a mismatch can occur between contents of the database because of a bug in an application that uses the database, an operational error of an operation, or the like. In general, a fault as described above is called a logic fault. In the case of a logic fault, since a database management system (hereinafter referred to as a DBMS) has properly completed the process according to the input, the fault can not be detected by a fault detecting function of the DBMS. A logic fault as described above is detected by database users such as a system manager or operator.

When a logic fault as described above has occurred, a manager or operator must identify the point in time when the logic fault occurred and restore the contents of the database up to a point in time which precedes the identified time of occurrence of the fault and at which data has consistency.

When it is stated that data has consistency, what is meant is that the data has been updated in conformity to an operation log recorded in an operation log file managed by a DBMS. A common DBMS reserves a buffer area for temporarily saving the contents of an update on a cache memory of the host computer on which the DBMS is operating, or the like. Even when an operator or the like makes a data update, the contents of the update is not immediately reflected on a data file and is held in the buffer area. In order to bring about a state in which data has consistency, the contents of all updates held on the buffer area must be reflected on the data file that is held in a storage or the like. Since the DBMS assumes that a fault has occurred in the data file when there is no consistency of data, the data file cannot be opened.

In order to restore the contents of the database up to a point in time when the data has consistency, a snapshot must be acquired in advance in a state in which data has consistency. For this purpose, it is necessary to staticize the database and acquire a snapshot thereof in a state in which data has consistency. Snapshot is to maintain data to be snapshot at a certain point in time in an external storage, and it is a function provided by most storage systems.

Staticizing a database is to stop a process of updating a data file in the database. Unless the database is staticized, since an update process may be performed on data to be snapshot, data consistency is lost and, even if the snapshot is acquired, it will be data which cannot be used for data recovery.

In a nonstop-operated database system in which a database is accessed 24 hours, it is difficult to staticize the database. For this reason, some DBMS provide a function to staticize a database virtually while executing access to a data file (hereinafter referred to as a virtual database staticizing function). However, since the virtual database staticizing function is executed by a DBMS, it increases the load on the host computer on which the DBMS operates. Further, since database stacisization must be executed until data snapshot is completed, it is very much difficult to use it in a large-scale database or environment under a heavy load when influences on regular tasks are taken into consideration.

As a method for solving to the above-described problems, a method is under study, in which a DBMS cooperates with software operating on a host computer or an external storage to reduce the load on the host computer at the time of data snapshot as much as possible.

A typical approach is to staticize a virtual database using a virtual database staticizing function of a DBMS and to create a snapshot of a file or logical volume which is to be snapshot at the point in time when the database is staticized. When the creation of the snapshot is completed, the virtual database staticization is canceled, and the DBMS returns to a normal operation. Next, backup software or the like is used to make a copy of the snapshot in a backup device.

A snapshot can be created by using an LVM (Logical Volume Manager) of an, software provided by various vendors, or a snapshot creating function provided by an external storage.

When a snapshot is to be acquired by an automatic operation utilizing an application such as scheduling software according to this method, the application must request the DBMS to staticize the database to put the database in a consistent state, at a time when a snapshot is to be acquired, and it must create a snapshot while the database is staticized.

When the LVM or software is used, the LVM or software must have means for requesting a DBMS to staticize a database. The DBMS is also required to have the database staticizing function or an application interface which allows database staticization to be executed according to a request from an external application. This places a limit on software and DBMS that can be used or necessitates modifications of software or DBMS.

Further, since the LVM and software operate on a host computer, loads are placed on the host computer not only when a snapshot is created but also by management of the snapshot or the like.

In order to mitigate the above-described problems, methods for acquiring a snapshot having consistency without placing an unduly heavy load on a host computer are under study. For example, a method may be employed in which a snapshot function provided by some external storage is used. In this case, a host computer requests an external storage to create a snapshot through an interface provided by the external storage; the external storage creates a snapshot upon receipt of the request; and the management of the snapshot is thus conducted by the external storage. As a result, the host computer is freed from loads other than a load associated with the issue of the snapshot creation request.

The use of a snapshot acquired according to the above method makes it possible to restore consistent data when a logic fault or the like has occurred. This schematically illustrated in FIG. 1. First, as shown in FIG. 1, data in which a logic fault has occurred is restored to the snapshot data that is closest to the time of occurrence of the fault among snapshots acquired before the occurrence of the logic faults.

Next, data updates which have been made to the data until immediately before the occurrence of the logic fault are re-executed (hereinafter referred to as roll forward). The roll forward is a function which is provided by a common DBMS.

According to the above-described method, in general, a system manager or a program or batch job operating on a host computer requests a DBMS to staticize the database, and the system manager or the like issues a snapshot creation request to an external memory while the database is staticized. When the creation of a snapshot is completed, the system manager or the like cancels the database staticization and acquires the snapshot. The database staticization is executed by the DBMS. Therefore, a load is placed on the host computer on which the DBMS operates when the database is staticized.

The above-described method makes it possible to restore data having consistency before the occurrence of a logic fault.

However, in a nonstop-operated database system, since a reduction in processing performance attributable to a virtual database staticizing process performed for each snapshot can be a problem, it is necessary to acquire snapshots by selecting a time zone in which the host computer has a relatively light load or to keep the frequency of the database staticizing process as low as possible. Such a restriction reduces the number of points at which a logic fault can be recovered. When the number of points where recovery is enabled is reduced, a problem arises in that a long time is required to execute a roll forward process from the data of a snapshot until a state immediately before the occurrence of a logic fault.

Further, since the database staticizing process may involve a separate interface for each DBMS and some DBMS may not have required functions, it is difficult to manage backup and restoration in an environment where various platforms exist.

SUMMARY OF THE INVENTION

It is therefore an object of the invention to make it possible to acquire a snapshot using a method which does not involve staticization.

It is another object of the invention to set as large number of points where recovery of the snapshot due to the logic fault is enabled as possible.

It is another object of the invention to manage backup and restoration in an environment where various platforms exist.

A snapshot acquisition controller according to one aspect of the invention cooperates with a computer system having a host computer on which a database management program (hereinafter referred to as DBMS) is operating, an external storage which stores data managed by DBMS, and a snapshot function unit for acquiring a snapshot of data on the external storage upon receipt of a snapshot acquisition request, the DBMS intermittently executing a checkpoint process for temporarily storing update data for updating data on the external storage in a buffer and outputting all update data accumulated in the buffer to the external storage according to timing controlled by itself. The snapshot acquisition controller has checkpoint detection means which detects the execution of the checkpoint process that the DBMS intermittently executes according to timing controlled by itself and snapshot acquisition request means which transmits the snapshot acquisition request to the snapshot function unit when the execution of the checkpoint is detected by the checkpoint detection means.

In a preferred embodiment, the checkpoint detection means detects the execution of the checkpoint process by monitoring an operation or information that the DBMS externally exhibits.

In a preferred embodiment, the checkpoint detection means detects the execution of the checkpoint process by monitoring an operation performed on the external storage by the DBMS or information output to the external storage by the same.

In a preferred embodiment, the checkpoint detection means detects the execution of the checkpoint process by monitoring an operation log that is a record of history of operations including the checkpoint process executed by the DBMS.

In a preferred embodiment, when the DBMS has a user interface for a manager and outputs information regarding the checkpoint process to the user interface for a manager, the checkpoint detection means detects the execution of the checkpoint process by monitoring information output by the DBMS to the user interface for a manager.

In a preferred embodiment, when the DBMS executes the checkpoint process at a first time interval, the checkpoint detection means performs a monitoring operation for detecting the checkpoint process at a second time interval shorter than the first time interval.

In a preferred embodiment, the snapshot acquisition request is transmitted without requesting the DBMS to staticize a database or to staticize a virtual database.

In a preferred embodiment, the snapshot acquisition controller further has identification information storing means which stores checkpoint identification information for identifying a detected checkpoint process and snapshot identification information for identifying an acquired snapshot in association with each other when the snapshot is acquired as a result of detection of the execution of the checkpoint process.

In a preferred embodiment, the snapshot acquisition controller further has snapshot restoration instructing means which, upon receipt of a snapshot recovery instruction including the specification of arbitrary checkpoint identification information, acquires snapshot identification information stored in association with the specified checkpoint identification information from the identification information storing means and which transmits a restoration request for a snapshot identified by the acquired snapshot identification information to the snapshot function unit or a predetermined functional unit having a snapshot restoring function.

A computer program for controlling acquisition of a snapshot according to another aspect of the invention is used in conjunction with a computer system having a host computer on which a DBMS is operating, an external storage which stores data managed by DBMS, and a snapshot function unit for acquiring a snapshot of data on the external storage upon receipt of a snapshot acquisition request, the DBMS intermittently executing a checkpoint process for temporarily storing update data for updating data on the external storage in a buffer and outputting all update data accumulated in the buffer to the external storage according to timing controlled by itself. The computer program causes a computer in or out of the computer system to execute the steps of detecting the execution of the checkpoint process that the DBMS intermittently executes according to timing controlled by itself and transmitting the snapshot acquisition request to the snapshot function unit when the execution of the checkpoint is detected at the step of detecting a checkpoint.

A storage system used in conjunction with a host computer on which a DBMS operates according to another aspect of the invention has an external storage which stores data in a database managed by the DBMS, a snapshot function unit which acquires a snapshot of data on the external storage upon receipt of a snapshot acquisition request, and a snapshot acquisition control unit for controlling the acquisition of the snapshot. When the DBMS is adapted to temporarily store update data for updating the data on the external storage in a buffer and to intermittently execute a checkpoint process for outputting all update data accumulated in the buffer to the external storage at timing controlled by itself, the snapshot acquisition control unit has checkpoint detecting means which detects the execution of the checkpoint process that the DBMS intermittently executes at timing controlled by itself and snapshot acquisition requesting means which transmits the snapshot acquisition request to the snapshot function means when the execution of the checkpoint is detected by the checkpoint detection means.

BRIEF DESCRIPTION OF THE DRAWINGS

FIG. 3 is contents of a CP-SH correspondence management table.

FIG. 4 is contents of an SH management table.

DESCRIPTION OF THE PREFERRED EMBODIMENTS

Figure 1:
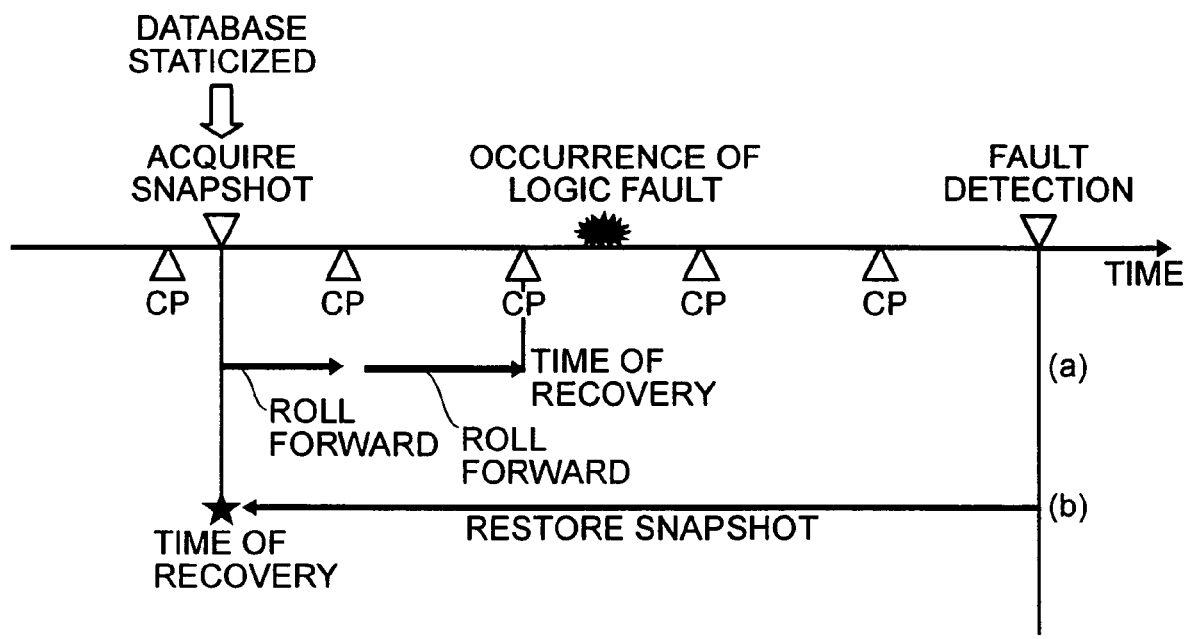
FIG. 1 is a timing chart for fault recovery according to the related art.

An embodiment of the invention will now be described using the drawings.

A schematic configuration of a database system which is an embodiment of the invention will be described using FIG. 2. In the figure, the database system is constituted by a host computer 10 and an external storage 20. For example, the host computer 10 and the external storage 20 are connected by an interface in compliance with Fibre Channel Protocol or Internet Protocol. For example, the host computer 10 is a computer such as a general purpose computer or workstation, and a database management system 11 (hereinafter referred to as a DBMS) and a snapshot acquisition control program 13 for detecting a checkpoint and controlling the acquisition of a snapshot are operating under a predetermined operating system. For example, the external storage 20 is a disk array subsystem which provides the DBMS 11 with storage areas of a database such as a data table 31, a Redo log 32, and an operation log 33, for example. Main data of the database are recorded in the data table 31. Information on all changes made to the database is recorded in the Redo log 32. Information on operations of the database is recorded in the operation log 33. The external storage 20 may be provided with a snapshot function unit 41 or the like for acquiring and restoring a snapshot of data in a storage area. Further, the external storage 20 also provides storage areas for data used by the snapshot acquisition control program 13, e.g., areas for a checkpoint-snapshot correspondence management table (hereinafter referred to as a CP-SH correspondence management table) 30 and a snapshot management table (hereinafter referred to as an SH management table) 40.

The DBMS 11 is a system which manages a database. The DBMS 11 executes a process of updating the database in the external storage 20 according to a request from a client such as a host application or a user which is not shown. The procedure of updating the database is as follows. Specifically, the DBMS 11 stores and accumulates data in a buffer 12 in the host computer 10. The DBMS 11 collectively outputs update data in the buffer to the external storage 20 at points in time that come in a discrete manner according to timing controlled by itself to update the data table 31, the Redo log 32, and the operation log 33 in the external storage 20 (FIG. 2: arrow 101).

The process of updating the data in the external storage 20 by flushing the data in the buffer 12 in such an intermittent manner is referred to as a checkpoint process. Thus, the data on the buffer 12 of the host computer 10 and the data stored in the external storage are put in a consistent state. The timing for the checkpoint process may be controlled based on a condition set by the user for the DBMS 11 (e.g., a timer setting) or may be controlled based on a particular condition of the DBMS 11 (e.g., buffer full). In either case, the timing is only required to be controlled internally to the DBMS 11, and the DBMS 11 is not required to have any special interface for externally providing information on the control of the timing. This allows various existing DBMS to be used as the DBMS 11 and the embodiment to be implemented in an environment where various platforms exit.

Figure 2:
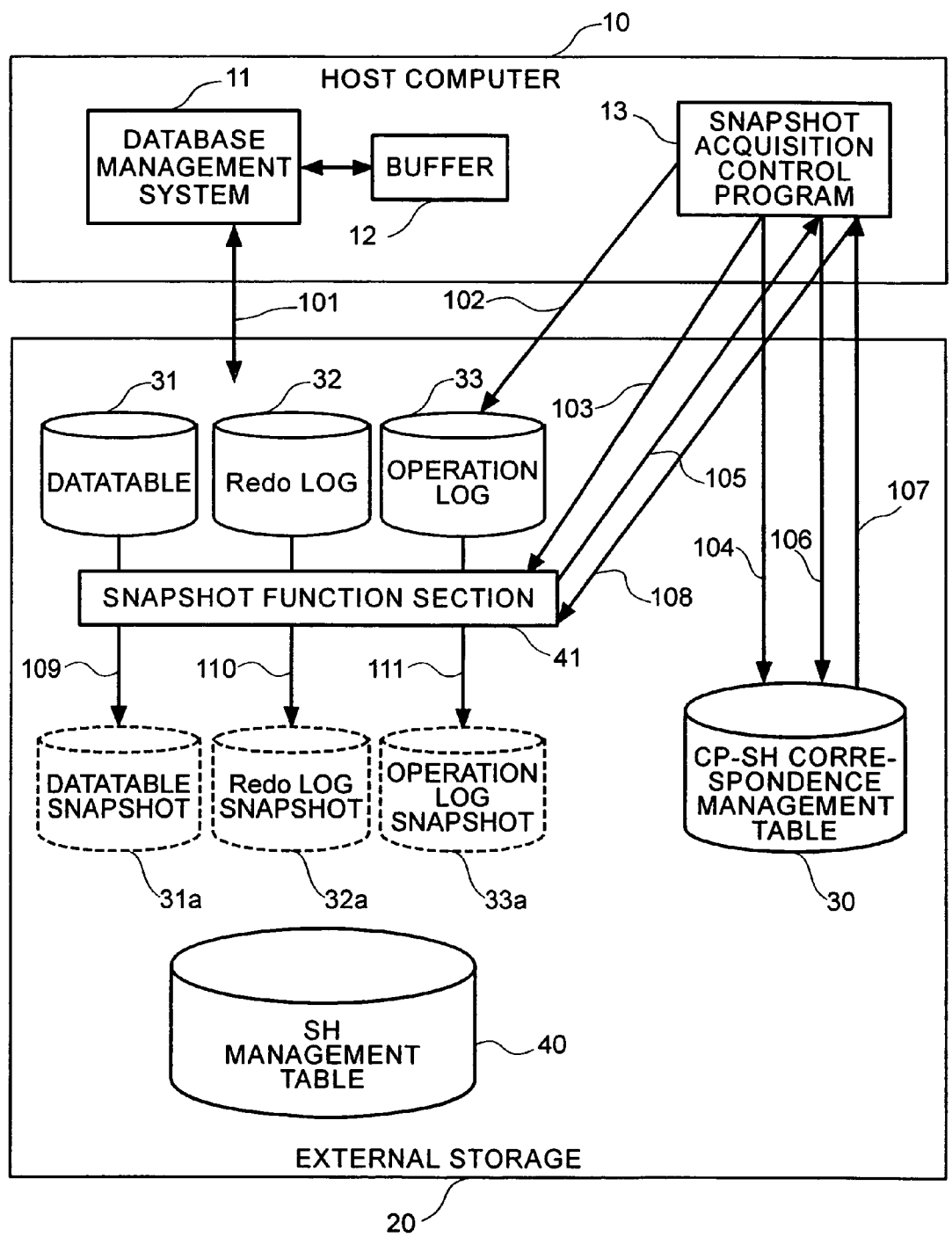
FIG. 2 is a configuration diagram of a computer system according to an embodiment of the invention.

The snapshot acquisition control program 13 continuously monitors whether the DBMS 11 has executed the checkpoint process or not (FIG. 2: arrow 102) and requests the snapshot function unit 41 in the external storage 20 to acquire a snapshot when a new checkpoint is detected (FIG. 2: arrow 103). As a specific method for detecting that the checkpoint process has been executed, this embodiment employs a method in which the operation log 33 of the external storage 20 is monitored. Specifically, each time the DBMS 11 executes the checkpoint process, it records so in the operation log 33. Therefore, it is possible to detect the fact that the checkpoint process has been processed by checking the contents of updates of the operation log 33. In this case, when the DBMS 11 executes checkpoint at intervals of t seconds, for example, the snapshot acquisition control program 13 checks the operation log 33 at intervals of T seconds which are shorter than t seconds. For example, the check intervals T may be arbitrarily set by the user.

When the snapshot acquisition control program 13 detects the execution of a new checkpoint process, it requests acquisition of a snapshot as described above (FIG. 2: arrow 103) and also reads and writes the checkpoint-snapshot correspondence management table (hereinafter referred to CP-SH correspondence management table) 30 in the external storage 20. Specifically, when the snapshot acquisition control program 13 detects the execution of the new checkpoint process, it stores a checkpoint ID for identifying the new checkpoint process in the CP-SH correspondence management table (FIG. 2: arrow 104) and requests the snapshot function unit 41 to acquire a snapshot (FIG. 2: arrow 103). When a snapshot is acquired, the snapshot acquisition control program 13 acquires a snapshot ID for identifying the snapshot acquired from the snapshot function unit 41 (FIG. 2: arrow 105) and stores the snapshot ID in the CP-SH correspondence management table 30 in association with the checkpoint ID (FIG. 2: arrow 6).

The snapshot acquisition control program 13 performs the above-described control each time the execution of a checkpoint process is detected. Thus, snapshots immediately after points in time when a checkpoint process is executed (points in time when the database is made consistent) are acquired one after another, and there is no need for separately requesting the DBMS 11 to staticize or virtually staticize the database.

When the snapshot acquisition control program 13 receives a restoration request message including a checkpoint ID to be restored from the system manager at an arbitrary point in time, it refers to the CP-SH correspondence management table 30 to acquire the snapshot ID associated with the checkpoint ID (FIG. 2: 107) and requests the snapshot function unit 41 to restore the snapshot (FIG. 2: 108).

The external storage 20 has the data table 31, the Redo log 32, the operation log 33, the CP-SH correspondence management table 30, and the snapshot management table (hereinafter referred to as SH management table) 40 for managing snapshots.

As described above, main data of the database are recorded in the data table 31, and information on data processing such as update and deletion of data, i.e., information on all changes made to the database is recorded in the Redo log 32. Information on operations of the database such as recording of snapshots and recording of checkpoints is recorded in the operation log 33. For example, the operation log 33 has records of an operation ID (e.g., a checkpoint ID) for identifying each process such as a snapshot process or checkpoint process, a time at which the process has been performed, and so on.

Checkpoint IDs and snapshot IDs are stored in association with each other in the CP-SH correspondence management table 30. FIG. 3 shows an example of data contents of the CP-SH correspondence management table 30. The checkpoint IDs are generated by the DBMS 11. The DBMS 11 uses the checkpoint IDs to manage respective checkpoint processes. The snapshot IDs are used for identifying respective snapshot processes, and the snapshot function unit 41 uses the snapshot IDs to manage the respective snapshots. Thus, the snapshot acquisition program 13 can acquire the ID of a snapshot associated with a checkpoint (performed immediately after the checkpoint process) from the CP-SH correspondence management table 30 and the checkpoint IDs.

The snapshot function unit 41 acquires (FIG. 2: arrow 109, arrow 110, arrow 111) or restores a snapshot when requested.

While the function of acquiring a snapshot is provided as a function of the external storage 20 in the present embodiment, it may be provided by software operating on the host computer 10 such as an LVM (Logical Volume Manager) loaded on an operating system of a host apparatus such as the host computer 10.

In the SH management table 40, the snapshot IDs, the addresses of snapshots 31*a* of the data table, the addresses of snapshots 32*a* of the Redo log, and the addresses of snapshots 33*a* of the operation log are recorded in association with each other. FIG. 4 shows an example of data contents of the SH management table 40. From the snapshot IDs, the external storage 20 can access respective snapshot data (the snapshots 31*a* of the data table, the snapshots 32*a* of the Redo log, and the snapshots 33*a* of the operation log) by referring to the SH management table 40.

Operations of the database system until it acquires a snapshot will be described using FIGS. 5 and 6.

Figure 5:
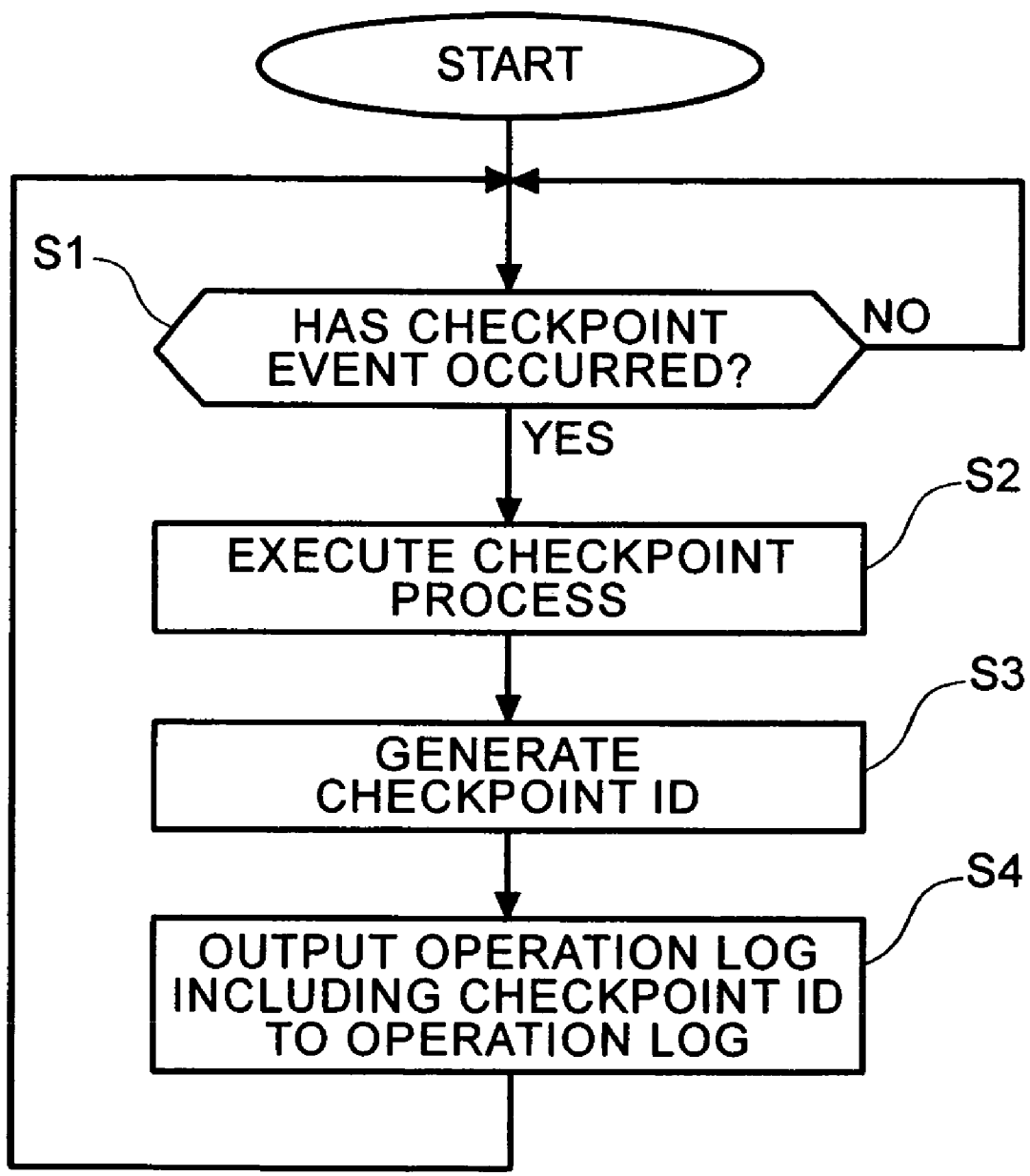
FIG. 5 is a flow chart showing a flow of processes at the time of execution of a checkpoint in a DBMS 11.

FIG. 5 shows a flow chart showing a flow of processes at the time of execution of checkpoint at the DBMS 11.

When a checkpoint event occurs, the DBMS 11 executes a checkpoint process (FIG. 5: S2.). The DBMS 11 generates a checkpoint ID (FIG. 5: S3) and records a checkpoint execution complete log including the checkpoint ID in the operation log 33 (FIG. 5: S4.). Referring to the destination of output of the operation log 33, the output may be provided to an interface for management such as a management console.

Figure 6:
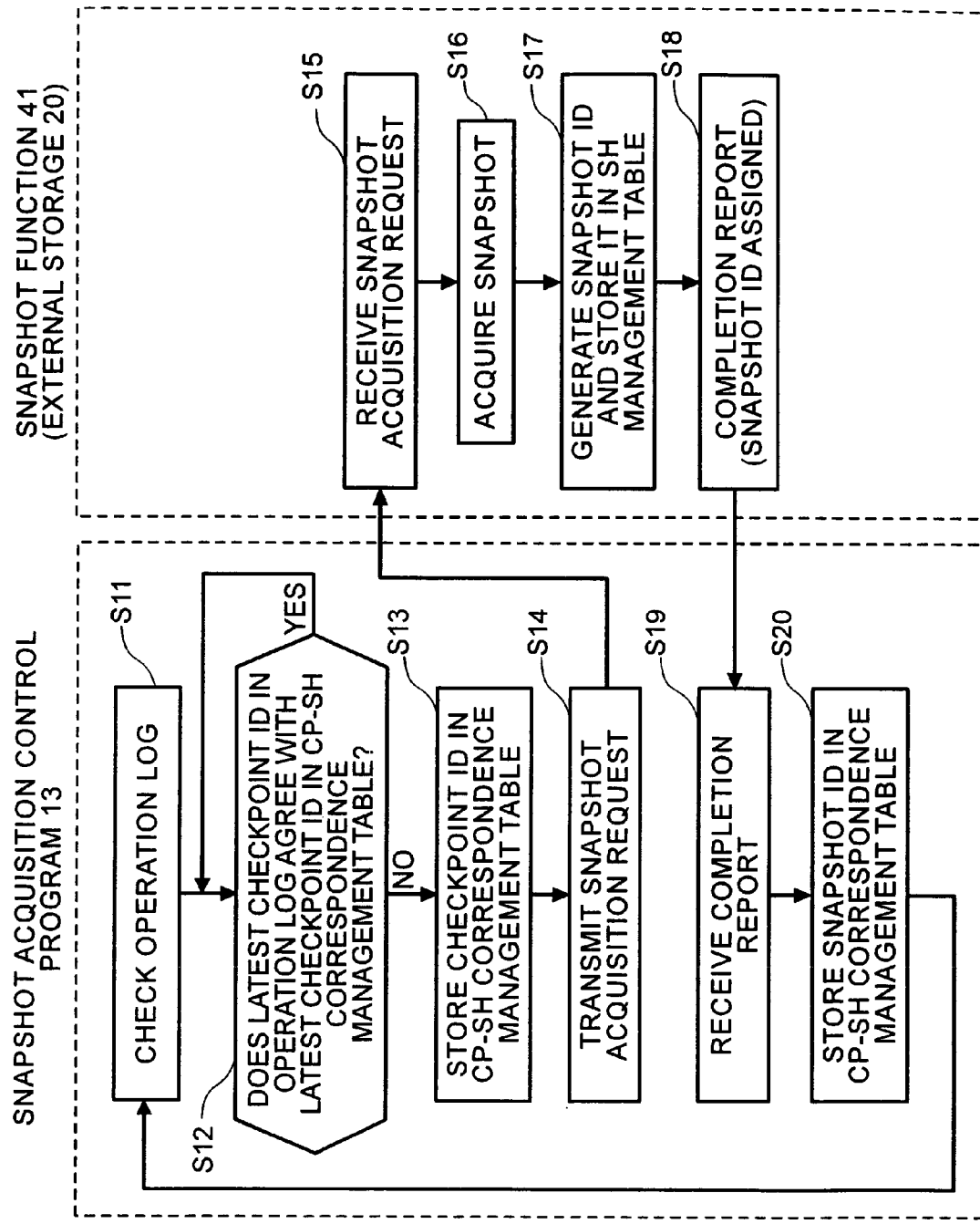
FIG. 6 is a flow chart showing a flow of processes at the time of acquisition of a snapshot.

FIG. 6 is a flow chart showing a flow of processes for acquiring a snapshot.

The snapshot acquisition control program 13 checks the operation log 33 at intervals of T seconds (FIG. 6: S11). When the latest checkpoint ID recorded in the operation log 33 agrees with the latest checkpoint ID recorded in the CP-SH correspondence management table 30, it discards the read checkpoint ID and sleeps until the next checkpoint. When the latest checkpoint ID in the operation log 33 is different from the latest checkpoint ID in the CP-SH correspondence management table 30 (FIG. 6: S12) (i.e., when a new checkpoint process different from the recorded checkpoint has been executed), the checkpoint ID is stored in the CP-SH correspondence management table 30 (FIG. 6: S13). Then, a snapshot acquisition request is transmitted to the external storage 20 (FIG. 6: S14).

When the external storage 20 receives the snapshot acquisition request from the snapshot acquisition control program 13 (FIG. 6: S15), the external storage 20 acquires a snapshot 31*a* of the data table, a snapshot 32*a* of the Redo log 32, and a snapshot 33*a* of the operation log (FIG. 6: S16). The external storage 20 generates a snapshot ID to manage the snapshot and records the snapshot ID and the locations of the respective snapshots (i.e., the snapshot 31*a* of the data table, the snapshot 32*a* of the Redo log, and the snapshot 33*a* of the operation log) in the SH management table 40 in association with each other (FIG. 6: S17). Thus, the external storage 20 can acquire the snapshots (i.e., the snapshot 31*a* of the data table, the snapshot 32*a* of the Redo log, and the snapshot 33*a* of the operation log) from the snapshot ID. The external storage 20 transmits to a snapshot completion report added with the snapshot ID to the snapshot acquisition control program 13 (FIG. 6: S18).

The snapshot acquisition control program 13 receives the snapshot completion report from the external storage 20 (FIG. 6: S19) and records the snapshot ID in the CP-SH correspondence management table 30 in association with the relevant checkpoint ID (FIG. 6: S20)

A recovery process at the occurrence of a fault will now be described using FIGS. 7 and 8.

Figure 7:
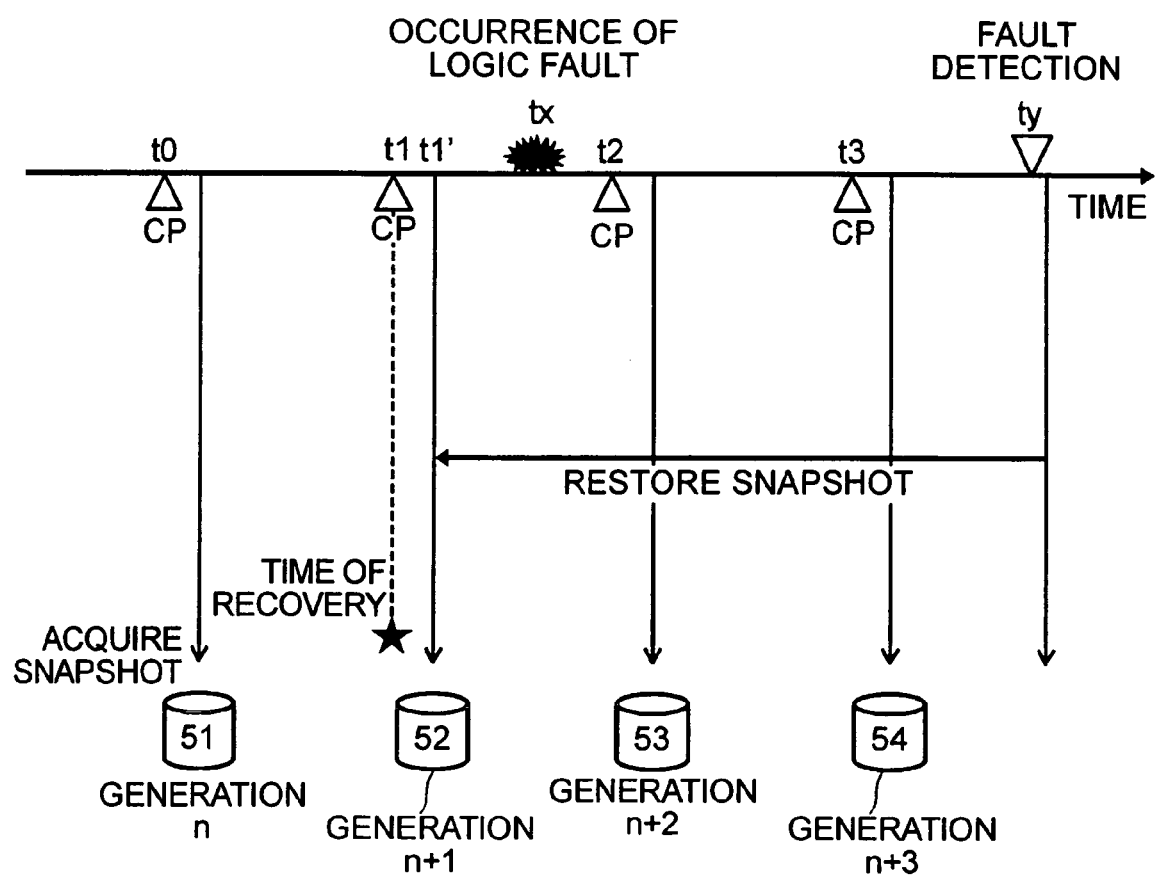
FIG. 7 is a timing chart associated with fault recovery.

In FIG. 7, CP represents checkpoint processes; t0, t1, t2, and t3 represent the times of the respective checkpoint processes; tx represents a time at which a logic fault occurs; ty represents a time at which the fault is detected; and 51 to 54 represent snapshots at respective times.

The DBMS 11 executes checkpoint processes at preset time intervals of t seconds. The snapshot acquisition program 13 checks the contents of the operation log 33 at intervals of T seconds. Although the check interval T may be arbitrarily set as the user specifies, T<t must be true.

Figure 8:
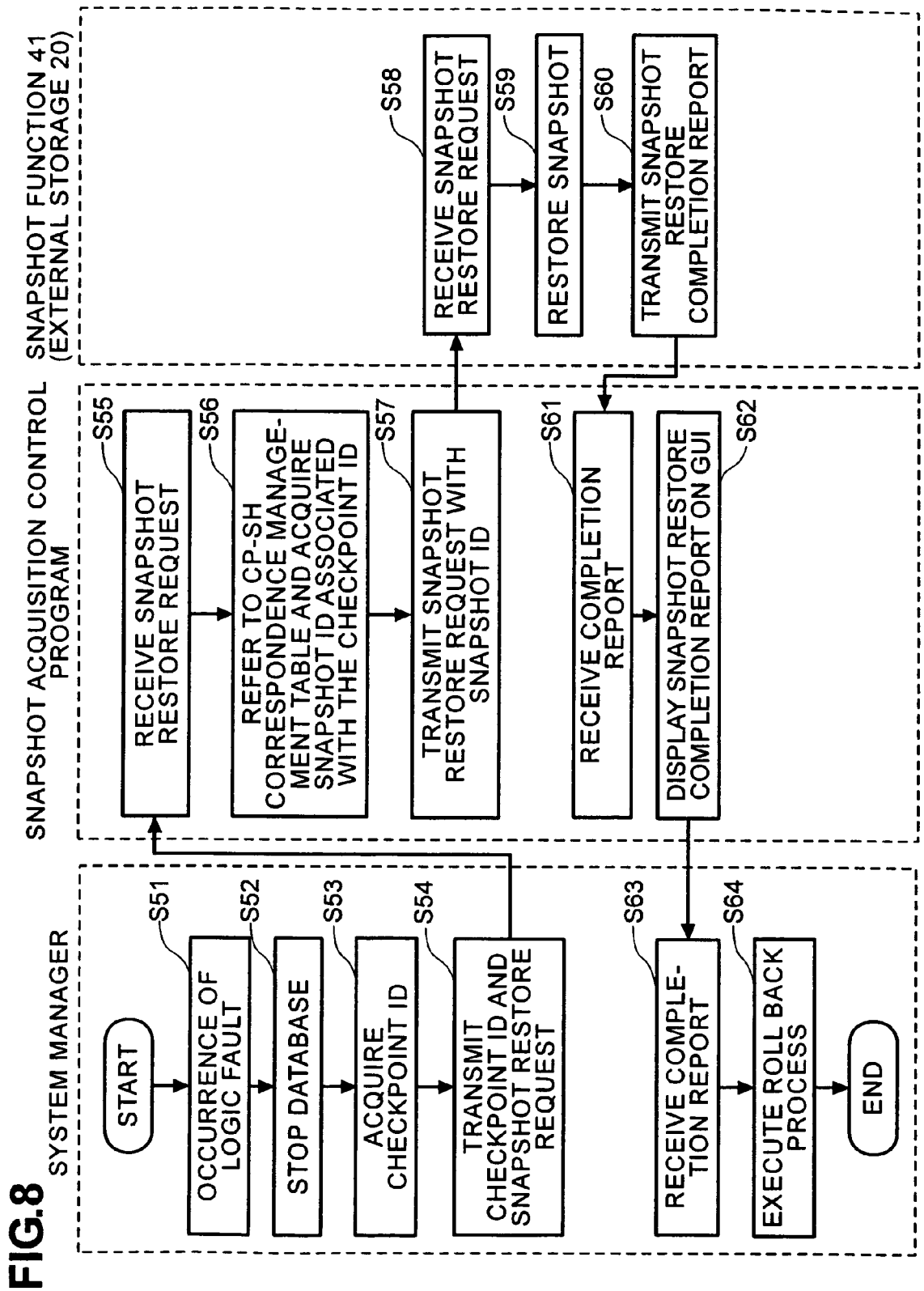
FIG. 8 is a flow chart showing a flow of processes at the time of recover of a snapshot.

At the time ty, the detection of the logic fault is reported to the system manager according to a report or the like from a database user or an application (FIG. 8: S51). The system manager prohibits access to the relevant data and starts a process of recovering from the logic fault (FIG. 8: S52).

The system manager checks the Redo log 32 and identifies a process performed at the time tx to be the cause of the logic fault. Further, the system manager acquires the time t1 of the checkpoint immediately before the process at the time tx and the checkpoint ID for the same from the operation log 33 (FIG. 8: S53). The system manager inputs the checkpoint ID acquired from the operation log 33 to the snapshot acquisition control program 13 and requests snapshot restoration (FIG. 8: S54). As a result, a snapshot restoration request event occurs in the snapshot acquisition control program 13 (FIG. 8: S55).

The input of the checkpoint to the snapshot acquisition control program 13 is carried out by using an interface such as a GUI provided by the same program. The input may alternatively be made from another program using an API provided by the same program.

When the snapshot restoration request event occurs (FIG. 8: S55), the snapshot acquisition control program 13 acquires the snapshot ID associated with the checkpoint ID by referring to the CP-SH correspondence management table 30 (FIG. 8: S56). The snapshot acquisition control program 13 requests the external storage 20 (or the snapshot function) to restore the snapshot to which the snapshot ID is assigned (FIG. 8: S57).

The external storage 20 receives the snapshot restoration request from the snapshot acquisition control program 13 (FIG. 8: S58) and restores the relevant snapshot from the snapshot ID by referring to the SH management table 40 (FIG. 8: S59). When the snapshot restoring process is completed, the external storage 20 transmits a snapshot restoring process completion report to the snapshot acquisition control program 13 (FIG. 8: S60). The snapshot restore completion report may be in any form, e.g., a display of a message to the management console or the like, a report to a separate program or a report to the snapshot acquisition control program 13, as long as the report allows a snapshot restore completion event to be recognized. In the embodiment, the snapshot acquisition control program 13 receives the snapshot restore completion report from the external storage 20 (FIG. 8: S61) and reports the completion of snapshot restoration to the system manager using a GUI (FIG. 8: S62).

Strictly speaking, the data table for which the snapshot restoring process has been competed is in the state at a time to'which is a time later than the time to rather than the state at the time t1 (FIG. 7). The reason is that the snapshot acquisition process is not performed simultaneously with the checkpoint, but the snapshot acquisition process is performed when the snapshot acquisition control program 13 detects the execution of a new checkpoint process as a result of checking of the operation log 33 at the intervals of T seconds.

The data contents may have been updated between the time t1 and the time t1'. When the system manager receives the snapshot restoring process completion report from the snapshot acquisition control program 13 (FIG. 8: S63), it can return the data table 31 to the state at the time to by executing a roll back process using a roll back function which the DBMS 11 commonly has (FIG. 8: S64). It is thus possible to restore the data which immediately precedes the occurrence of the logic fault and for which consistency is guaranteed (i.e., the data at the time t1).

Figure 9:
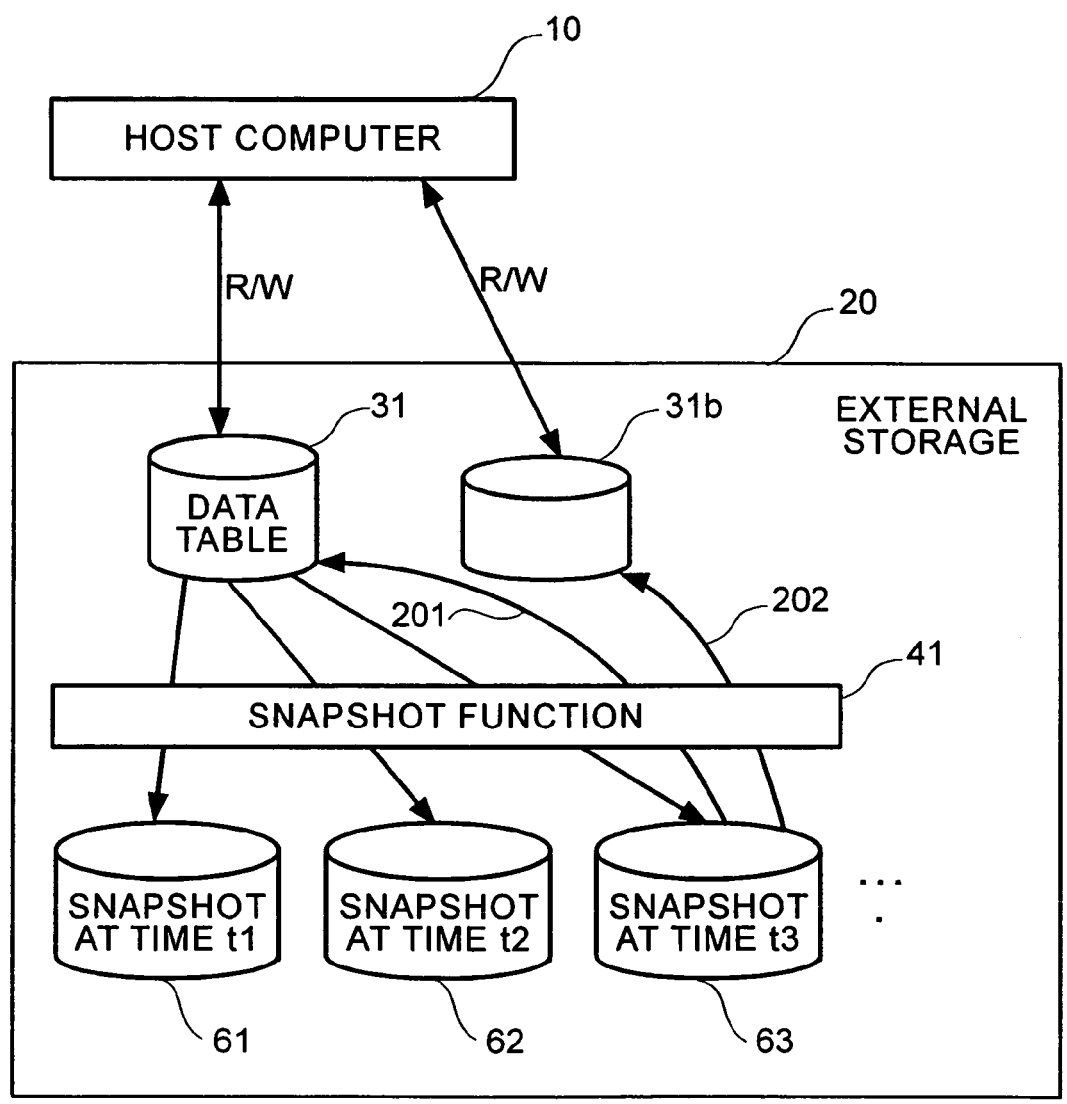
FIG. 9 shows an image of the restoration of a snapshot.

FIG. 9 shows an image of the snapshot restoring process. A snapshot is created for each checkpoint in the data table 31. To restore the snapshot at a certain point in time (FIG. 9: 63), it may be overwritten in the original area of the data table (FIG. 9: 201) or restored (FIG. 9: 202) in a different area (FIG. 9: 31b)

While a preferred embodiment of the invention has been described above, the examples are only illustrative of the invention, and it is not intended to limit the scope of the invention to this embodiment. The invention may therefore be carried out in various other modes.

For example, while the data table 31, the Redo log 32, and the operation log 33 are stored in the external storage 20 in the present embodiment, each of them may be stored in a storage other than the external storage 20 or stored on a network on a distributed basis.

While the data table 31 and the snapshots 31a of the data table are stored in the external storage 20 in the present embodiment, the snapshots may be stored in a storage separate from the external storage 20 in which the data table 31 is stored. While the Redo log 32 and the snapshots 32a of the Redo log 32 are stored in the external storage 20, the snapshots may be stored in a storage separate from the external storage 20 in which the Redo log 32 is stored. Further, while the operation log file 33 and the snapshots 33a of the operation log file are stored in the external storage 20, the snapshots may be stored in a storage separate from the external storage 20 in which the operation log file 33 is stored.

While the operation log 33 in the external storage 20 is monitored as means for detecting a checkpoint in the present embodiment, the checkpoint process may be monitored using any method such as direct monitoring of the DBMS 11 or monitoring of a checkpoint execution log of the console. In this case, however, it is sufficient to monitor the operation of the external storage 20, and there is no need to know the timing control over the checkpoint process or to conduct the control internally.

While snapshots of the data table 31, the Redo log 32, and the operation log 33 are acquired in the present embodiment, snapshots may be acquired only for the data table.

A program other than the system manager or the snapshot acquisition control program 13 may request the snapshot 41 to restore a snapshot based on a checkpoint ID identified by the system manager from the Redo log 32 and using a snapshot ID detected by the snapshot acquisition control program 13.

The invention makes it possible to acquire a snapshot without conducting staticization or virtual staticization and to acquire snapshots at the same frequency as that of the points in time of checkpoints which constitute the shortest units in which a database can be recovered from a logic fault. Thus, the database can be restored in a short time up to the point in time closest to the time of occurrence of the logic fault.

According to the invention, since checkpoints and snapshots are managed in association with each other, a database manager or management program can automatically select a necessary snapshot only by specifying a checkpoint, which allows processes to be simplified.

According to the invention, it is possible to utilize the logic fault recovery function, i.e., the function of restoring to a checkpoint that DBMS generally have without relying upon specific functions such as a staticizing process or specific interfaces that some DBMS have.

What is claimed is:

1. A storage system used in conjunction with a host computer, comprising:
 a storage which is external to the host computer and stores data in a database managed by said host computer;

a snapshot acquisition unit which acquires a snapshot of data on said storage upon receipt of a snapshot acquisition request; and a snapshot acquisition control unit for controlling the acquisition of said snapshot, said snapshot acquisition control unit detects the execution of a checkpoint process executed by the host computer at timing controlled by said host computer, and transmits said snapshot acquisition request to said snapshot acquisition unit when the execution of said checkpoint is detected, wherein said snapshot acquisition control unit detects the execution of said checkpoint process by monitoring an operation log that is a record of history of operations including said checkpoint process executed by said host computer, and when said checkpoint process occurs, a checkpoint ID is generated, and a checkpoint execution complete log including the checkpoint ID is generated in the operation log.

2. A storage system according to claim 1, wherein the snapshot acquisition control unit checks the operation log at a fixed time interval.

3. A storage system according to claim 2, wherein when a latest checkpoint ID recorded in the operation log agrees with a latest checkpoint ID recorded in a CP-SH correspondence management table, the snapshot acquisition control unit discards the read checkpoint ID and sleeps until a next checkpoint process.

4. A storage system according to claim 2, wherein when a latest checkpoint ID in the operation log is different from a latest checkpoint ID in a CP-SH correspondence management table, the snapshot acquisition control unit transmits a snapshot acquisition request to the storage.

5. A storage system according to claim 4, wherein when the storage receives the snapshot acquisition request from the snapshot acquisition control unit, the storage acquires a snapshot of a data table, a snapshot of a Redo log, and a snapshot of the operation log, and the storage generates a snapshot ID to manage the snapshots in said logs, and records the snapshot ID and the locations of the snapshots in said logs in a snapshot management table.

6. A storage system according to claim 5, wherein the storage acquires snapshots in said logs based upon a snapshot ID.

7. A storage system according to claim 5, wherein the storage transmits a snapshot completion report with the snapshot ID to the snapshot acquisition control unit.

8. A storage system according to claim 7, wherein the snapshot acquisition control unit receives the snapshot completion report from the storage and records the snapshot ID in the CP-SH correspondence management table in association with the checkpoint ID.

9. A storage system according to claim 1, wherein when the host computer executes said checkpoint process at a first time interval, the snapshot acquisition control unit detects said checkpoint process at a second time interval shorter than said first time interval.

10. A method for acquiring a snapshot of a storage system having a storage used in conjunction with a host computer, comprising:

detecting execution of a checkpoint process executed by the host computer at timing controlled by said host computer by monitoring an operation log that is a record of history of operations including said checkpoint process;

whenever said checkpoint process occurs, generating a checkpoint ID and a checkpoint execution complete log including the checkpoint ID in the operation log; checking the operation log at a fixed time interval;

when a latest checkpoint ID in the operation log is different from a latest checkpoint ID in a CP-SH correspondence management table, transmitting a snapshot acquisition request to the storage;

when receiving the snapshot acquisition request, the storage acquiring a snapshot of a data table, a snapshot of a Redo log, and a snapshot of the operation log, the storage generating a snapshot ID to manage the snapshots in said logs, and the storage recording the snapshot ID and the locations of the snapshots in said logs in a snapshot management table, the storage acquiring snapshots in said logs based upon a snapshot ID;

the storage transmitting back a snapshot completion report with the snapshot ID; and after receiving the snapshot completion report from the storage, recording the snapshot ID in the CP-SH correspondence management table in association with the checkpoint ID.

11. A storage system used in conjunction with a host computer, comprising:

a storage which is external to the host computer and stores data in a database managed by said host computer;

a snapshot acquisition unit which acquires a snapshot of data on said storage upon receipt of a snapshot acquisition request; and a snapshot acquisition control unit for controlling the acquisition of said snapshot, said snapshot acquisition control unit detects the execution of a checkpoint process executed by the host computer at tinting controlled by said host computer, and transmits said snapshot acquisition request to said snapshot acquisition unit when the execution of said checkpoint is detected, wherein said snapshot acquisition control unit detects the execution of said checkpoint process by monitoring an operation log that is a record of history of operations including said checkpoint process executed by said host computer, said snapshot acquisition control unit checks the operation log at a fixed time interval, and when a logic fault occurs at a time Tx and detected at a time Ty, a time T1 when a checkpoint process occurs immediately before the time Tx and a corresponding checkpoint ID are retrieved from the operation log to start a snapshot restoring process.

12. A storage system according to claim 11, wherein the snapshot acquisition control unit acquires a snapshot ID associated with the checkpoint ID by referring to a CP-SH correspondence management table, and requests the storage to restore a corresponding snapshot to which the snapshot ID is assigned.

13. A storage system according to claim 12, wherein the storage receives a snapshot restoration request from the snapshot acquisition control unit and restores the corresponding snapshot by referring to a snapshot management table.

14. A storage system according to claim 13, wherein when the snapshot restoring process is completed, the storage transmits a snapshot restoring process completion report to the snapshot acquisition control unit.

15. A storage system according to claim 14, further comprising a system manager, wherein the snapshot acquisition control unit transfers the snapshot restoring process completion report to the system manager, and then the system manager returns a data table to a state at the time T1 by executing a roll back process.

16. A storage system according to claim 14, further comprising a system manager, wherein at the time Ty, the logic fault is detected and reported to the system manager, and the system manager prohibits access to relevant data.

17. A storage system according to claim 13, wherein said snapshot restoration request is transmitted without requesting said host computer to staticize a database or to staticize a virtual database.

18. A method for restoring a snapshot of a storage system having a storage used in conjunction with a host computer, comprising:
- detecting execution of a checkpoint process executed by the host computer at timing controlled by said host computer by monitoring an operation log that is a record of history of operations including said checkpoint process;
- checking the operation log at a fixed time interval;
- when a logic fault occurs at a time Tx and detected at a time Ty, retrieving from the operation log a time T1 when a checkpoint process occurs immediately before the time Tx and a corresponding checkpoint ID to start a snapshot restoring process;
- at the time Ty, prohibiting access to relevant data;
- acquiring a snapshot ID associated with the checkpoint ID by referring to a CP-SH correspondence management table;
- requesting the storage to restore a corresponding snapshot to which the snapshot ID is assigned;
- the storage receiving a snapshot restoration request and restoring the corresponding snapshot by referring to a snapshot management table;
- when the snapshot restoring process is completed, the storage transmitting back a snapshot restoring process completion report; and
- returning a data table to a state at the time T1 by executing a roll back process.

19. A method according to claim 18, wherein said snapshot restoration request is transmitted without requesting said host computer to staticize a database or to staticize a virtual database.

* * * * *